United States Patent [19]

Gitman

[11] Patent Number: 4,923,391
[45] Date of Patent: May 8, 1990

[54] REGENERATIVE BURNER

[75] Inventor: Gregory M. Gitman, Duluth, Ga.

[73] Assignee: American Combustion, Inc., Norcross, Ga.

[21] Appl. No.: 180,445

[22] Filed: Apr. 12, 1988

Related U.S. Application Data

[63] Continuation-in-part of Ser. No. 883,769, Jul. 9, 1986, Pat. No. 4,797,087, which is a continuation-in-part of Ser. No. 755,831, Jul. 15, 1985, Pat. No. 4,642,047, which is a continuation-in-part of Ser. No. 642,141, Aug. 17, 1984, Pat. No. 4,622,007, and a continuation-in-part of Ser. No. 60,420, Aug. 3, 1987, Pat. No. 4,874,311.

[51] Int. Cl.$^5$ .............................................. F23D 11/44
[52] U.S. Cl. ..................................... 431/10; 431/161; 431/8; 431/174; 431/11; 432/20; 432/28; 432/181; 432/182
[58] Field of Search ..................... 431/7, 11, 161, 164, 431/166, 170, 215, 8, 174, 10; 432/20, 28, 30, 180, 181, 182

[56] References Cited

U.S. PATENT DOCUMENTS

| | | | |
|---|---|---|---|
| 3,345,054 | 10/1967 | Andonjev et al. | 432/20 X |
| 3,895,918 | 7/1975 | Mueller | 110/212 X |
| 4,252,070 | 2/1981 | Benedick | 431/5 X |
| 4,358,268 | 11/1982 | Neville | 432/180 |
| 4,453,913 | 6/1984 | Gitman | 431/8 |
| 4,496,315 | 1/1985 | Savolskis | 432/30 |
| 4,522,588 | 6/1985 | Todd et al. | 432/181 |
| 4,604,051 | 8/1986 | Davies et al. | 431/166 |
| 4,650,414 | 3/1987 | Grenfell | 431/5 |
| 4,756,688 | 7/1988 | Hammond et al. | 432/180 |

Primary Examiner—Carl D. Price
Attorney, Agent, or Firm—Needle & Rosenberg

[57] ABSTRACT

A method of combusting fuel in a furnace having a pair of regenerative burners, each burner having a combustion chamber and a regenerative bed having an exhaust means incorporated therewith introducing simultaneously into said combustion chamber of each burner approximately identical amounts of fuel and approximately identical amounts of oxidizing gases from at least two sources of oxidizing gases having different oxygen concentration to produce two approximately identical flame patterns directed toward the interior of said furnace; terminating the supply of fuel and said oxidizing gases to one of said burners to create a non-firing burner having a non-firing period while maintaining the production of a flame in the remaining burner to create a firing burner having a firing period; applying negative pressure to the exhaust end of the regenerative bed of said non-firing burner to initiate the exhausting of flue gases produced by said firing burner; alternating the introduction of fuel and at least one oxidizing gas between the burners and simultaneously alternating the application of negative pressure to exhaust flue gases from the regenerative bed of the remaining burner to provide heat recovery from the exhausted flue gases by the regenerative bed of the non-firing burner and simultaneously preheating at least one said oxidizing gas being supplied to said firing burner; and controlling the total flow of fuel and oxygen supplied to each burner to provide each burner with a desired flame stoichiometry.

11 Claims, 4 Drawing Sheets

REGENERATIVE BURNER

This application is a continuation-in-part of application Ser. No. 883,769, filed July 9, 1986, now U.S. Pat. No. 4,797,087, which is a continuation-in-part of application Ser. No. 755,831, filed July 15, 1985, now U.S. Pat. No. 4,642,047, which is a continuation-in-part of application Ser. No. 642,141, filed Aug. 17, 1984, now U.S. Pat. No. 4,622,007; and this application is also a continuation-in-part of application Ser. No. 060,420, filed Aug. 3, 1987, now U.S. Pat. No. 4,874,311.

BACKGROUND OF THE INVENTION

The present invention relates to combustion systems, and more particularly to a regenerative burner designed to operate utilizing two chemically different oxidizing gases supplied into the combustion chamber of a burner wherein during at least part of operation one of said two oxidizing gases is supplied cyclically throughout the regenerator and is preheated by recovered heat previously stored in the regenerator.

Regeneration has been utilized since the 1850s for the recovery of heat from exhaust gases in a variety of high temperature combustion processes, such as glass melters and open hearths. The regenerative principle involves utilizing heat storage beds located on opposite sides of a furnace through which, on an alternating basis, furnace flue gases are exhausted, thereby transferring heat to the bed. This heat is recovered from the heat storage beds by blowing combustion air through each of the storage beds, also on an alternating basis.

The application of regenerative burner systems has been broadened in recent years to such areas as industrial heating and aluminum melting by the development of compact regenerative burner systems. This compact system utilizes two small burners, each containing a refractory bed for heat storage.

While the use of regeneration has substantially increased the energy efficiency of a variety of high temperature continuous heating processes, the systems currently in operation have faced a series of limitations when applied in batch charge applications. A primary problem has been a limitation of furnace productivity due to the deficiency in the ability of regenerative burners to transfer heat during the initial stages of a melting or heating process when the furnace is charged with a cold load.

Heat transfer from regenerative burners is limited because of their inability to provide a high velocity impinging flame. This results in limited contact between the load being heated and the hot combustion products produced from the regenerative burners located above the scrap pile. Only the top portions of the scrap pile are involved in intensive convective and radiative heat transfer from the flame, and the remainder of the pile is shielded from the flame. The exhaust gases enter the regenerative beds at very high temperatures even when the majority of the surface of the scrap pile is cold.

This deficiency in heat transfer necessitates raising the furnace atmosphere to temperatures sufficiently above product temperatures to cause the furnace refractory to radiate heat to the load. Raising the temperature of the furnace atmosphere results in the deterioration of furnace components and an increase in the temperature of flue gases exhausted from the furnace, and may also result in rapid oxidation of the load. The overall effect typically is a loss of yield.

Another problem is the rapid decline in system efficiency during operation due to plugging of the regenerative beds by solid dust particles and condensable volatiles carried with the flue gases. This plugging inhibits the flow of flue gases through the bed and reduces the capacity of the regenerative bed to recover heat. The plugging also results in reduced combustion air flow and therefore loss of firing capacity.

There exists, therefore, a need for a regenerative combustion system and a method which results in more efficient heating and melting, particularly in batch charge operations.

There also exists a need for a regenerative system and method which results in maximization of furnace throughput with a given regenerative bed heat recovery capacity.

There exists a further need for a system and method which reduces the problem of regenerative burner plugging.

There exists a still further need for a regenerative system and method which can utilize both burners to provide strong, high temperature impinging flames for the rapid melt down of materials and which can take advantage of the high level of energy recovery which can be provided by regeneration without reducing the furnace production rate.

SUMMARY OF THE INVENTION

The present invention relates to a regenerative combustion system for melting and for high temperature heating processes, and comprises a pair of regenerative burners, a combustion control train and an exhaust system. Each of the regenerative burners has a combustion chamber supplied with controllable flows of fuel and oxidizer gas from the combustion control train. The combustion control train communicates with two sources supplying oxygen in two chemically different oxidizing gases which have different oxygen concentrations. An exhaust duct in each of the two regenerative burners is utilized to evacuate flue gases throughout the regenerative bed. Optionally, the exhaust system may also communicate directly with the furnace atmosphere by an auxiliary flue duct. The exhaust system controls the flows of exhaust gases leaving the furnace interior so that at any moment gases are evacuated through an exhaust duct associated with only one of the regenerative beds, the auxiliary exhaust duct or both.

The regenerative system is designed to operate in two firing modes: a non-regenerative mode and a regenerative mode. The non-regenerative mode is used during the initial colder stages of the melting or heating process when both burners of the regenerative pair are used to generate a high momentum flame to maximize the firing rate and transfer heat towards the relatively cold charge.

Both oxidizing gases are used during the initial non-regenerative firing mode to maximize the firing rate and to increase adiabatic flame temperatures through oxygen participation. Depending on the burner embodiment, these oxidizing gases may be supplied to the combustion chambers of the burners as separate flows or as a mixture passing through or bypassing the regenerative bed. In this mode, exhaust gases of both burners are evacuated from the furnace interior by means of the auxiliary exhaust duct only.

During non-regenerative firing, the load temperature is raised so that the temperature differential between the flame and the charge decreases. This results in reducing the fraction of heat being absorbed by the charge and in increasing the fraction of heat leaving with the exhaust gases to a point at which it becomes more economical for the furnace operation to step-down the firing rate and initiate the regenerative firing mode.

The regenerative firing mode is used to recuperate heat from the exhaust gases by passing at least a portion of the exhaust gases through the regenerative bed of one of the burners which has been made to act as an exhaust duct as the other burner of the regenerative pair is firing. Flue gases passing through this regenerator deliver heat to the bed, and the heat is later recovered by passing through the same bed at least a portion of the oxidizing gas which is utilized by the regenerative burner when switched to a firing mode. The heat stored in the bed is finally reintroduced into the furnace interior with the preheated oxidizing gas.

The two different oxidizing gases utilized by the system may be air delivered by a blower and oxygen delivered from a storage tank. An oxygen concentrated oxidizing gas, such as oxygen or oxygen enriched air, is used to increase the flame temperatures, firing rate, and luminosity during the non-regenerative firing cycle. This oxygen concentrated oxidizing gas may also be used during the regenerative cycle to provide additional oxygen to further increase the firing rate and flame luminosity. The less oxygen concentrated oxidizing gas, for example, air, simultaneously supplies oxygen preheated with the regenerative bed. When the burner embodiment provides for mixing of the two oxidizing gases in two stages and the first oxidizing gas having the higher oxygen content is mixed with fuel inside the flame envelope under conditions substantially below stoichiometric, a luminous flame core is produced, resulting in increased efficiency of heat transfer.

Furnace flue gases become contaminated with particulate pollution during such periods as the initial melting of dirty scrap or during the refining cycle of the metal bath. Such particulates generate additional particulate emissions. The regenerative system of the present invention is capable of anticipating when particulate pollution will be high and utilizing an auxiliary exhaust duct during these cycles to prevent rapid plugging of the regenerative bed. System performance is thereby enhanced.

It is an object of the present invention to provide a regenerative combustion system and a method which results in more efficient heating and melting, particularly in batch charge operations.

It is also an object of the present invention to provide a regenerative system and method which results in maximization of furnace throughput with a given regenerative bed heat recovery capacity.

It is a further object of the present invention to provide a system and method which reduces the problem of regenerative burner plugging.

It is a further object of the present invention to provide a system and method which provides a highly luminous flame utilizing cold highly oxygen concentrated gas to pyrolyze the fuel during the first stage of combustion and to provide a second less oxygen concentrated gas preheated by a regenerative bed to further oxidize the pyrolyzed fuel.

It is still a further object of the present invention to provide a regenerative system and method which can utilize both burners to provide strong, high temperature impinging flames for the rapid meltdown of materials and which can take advantage of the high level of energy recovery which can be provided by regeneration without reducing the furnace production rate.

DETAILED DESCRIPTION OF THE INVENTION

The present invention comprises a pair of burner means, a combustion control system and an exhaust system as described below, with reference to the drawings in which like numbers indicate like parts throughout the views.

Figure 1:
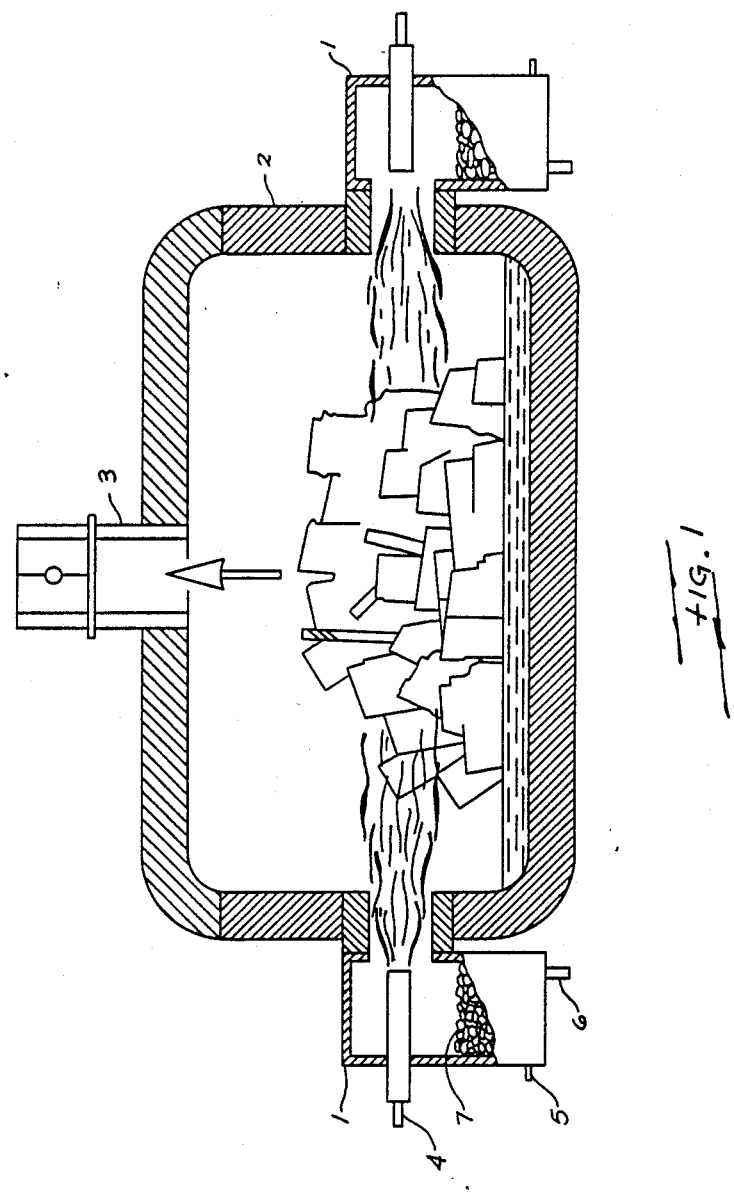
FIG. 1 is a longitudinal cross-sectional view of a furnace equipped with a pair of regenerative burners according to the present invention.

FIG. 1 shows two burners 1 installed in a melting furnace 2 equipped with an auxiliary flue duct 3. The burners 1 receive flows of fuel from a fuel inlet 4 and oxidizer gas, which may contain a mixture of two different oxidizing gases having different oxygen concentrations from inlet 5. A burner exhaust outlet 6 is used to evacuate flue gases from the furnace 2 through a regenerative bed 7.

Figure 2:
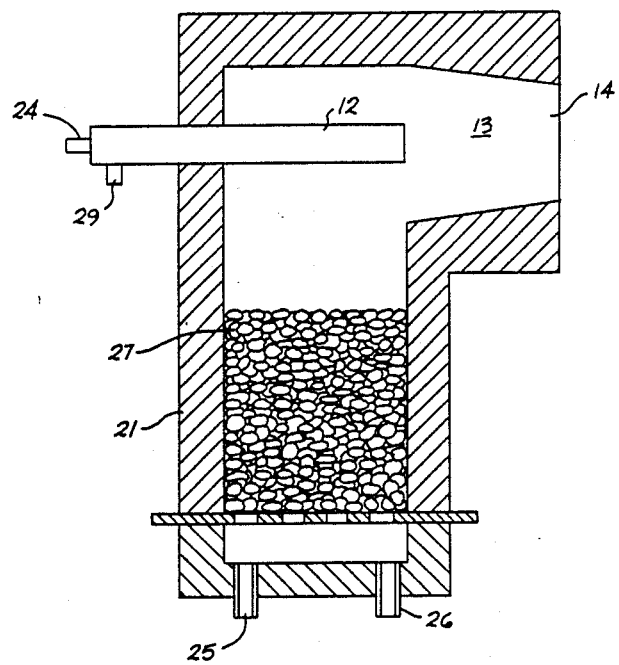
FIG. 2 is a longitudinal cross-sectional view of a regenerative burner according to the present invention.

FIG. 2 shows another embodiment of a regenerative burner 21 to be used in a regenerative furnace wherein two different oxidizing gases are separately introduced into a combustion chamber 13 to mix with the fuel stream being introduced through inlet 24. The first oxidizing gas, for example, air or oxygen enriched air, is introduced through inlet 25 and passes through the regenerative bed 27 prior to entering the combustion chamber 13. A secondary oxidizing gas having different oxygen concentration, for example, pure oxygen or oxygen enriched air, is introduced through inlet 29 and further is directed by a nozzle 12 to mix with the fuel stream which is also directed into the combustion chamber 13 through the nozzle 12. The burner 21 also has an nozzle 14 through which the flame is discharged into the furnace interior during the first part of the regenerative firing cycle. The flue gases are evacuated through the nozzle 14 during the second part, described below, of the regenerative firing cycle when negative pressure is applied to exhaust outlet 26.

Figure 3:
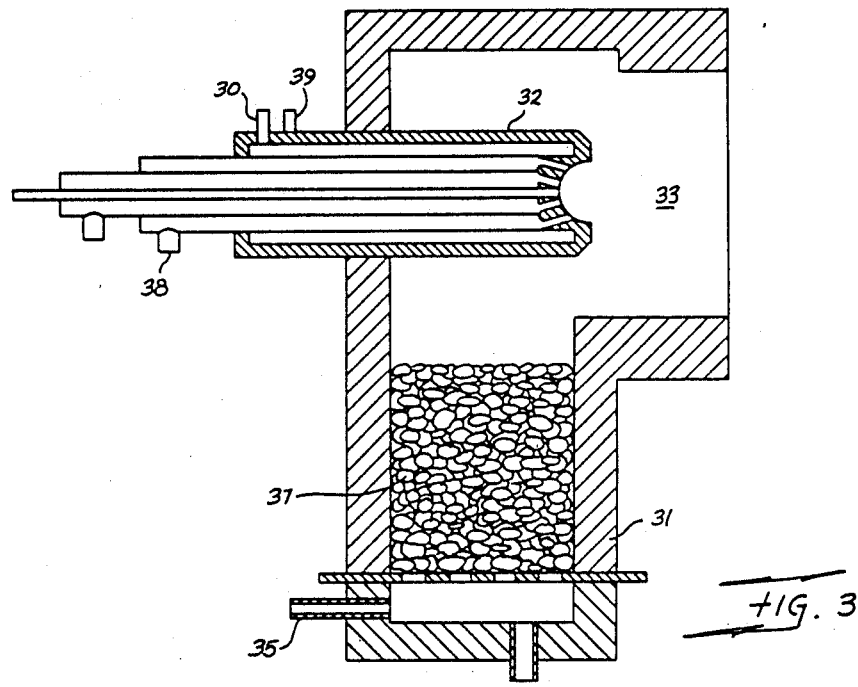
FIG. 3 is a longitudinal cross-sectional view of a second embodiment of a regenerative burner according to the present invention.

FIG. 3 shows another embodiment of the regenerative burner 31 of the present invention, wherein at least a part of a first oxidizing gas is introduced through an inlet 38 to by-pass the regenerative bed 37 during the non-regenerative firing cycle. When the burner 31 operates in the regenerative mode, the first oxidizing gas is delivered only to inlet 35 so that it passes through the regenerative bed 37 prior to entering the combustion chamber 33. The nozzle 32 also has its own watercooled precombustion chamber to premix fuel with a portion of a second oxidizing gas being introduced prior to entering the combustion chamber 33. Cooling water is introduced through an inlet 30 and evacuated through an outlet 39.

Figure 4:
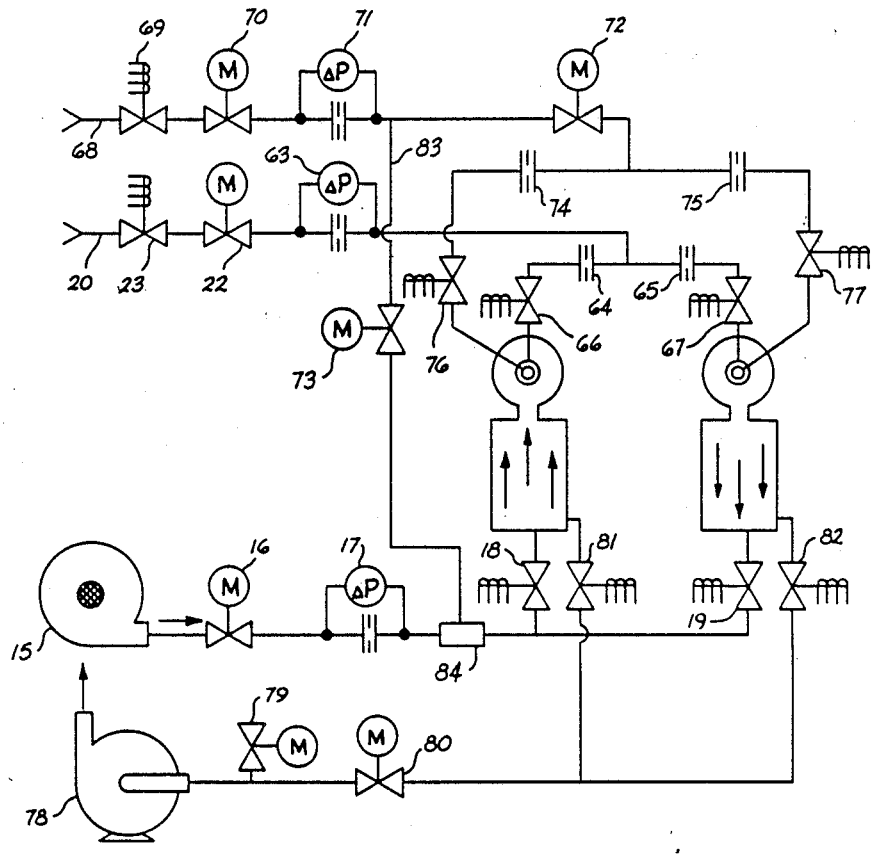
FIG. 4 is a combustion flow diagram of a regenerative burner system according to the present invention.

FIG. 4 shows the combustion flow diagram suitable to operate the regenerative burner embodiments shown in FIG. 1 and FIG. 2 having an air blower 15 supplying combustion air as a first oxidizing gas through a first motorized valve 16, an electrical flow meter 17 and switching valves 18, 19 to the regenerative burners 1 or 21. Fuel is supplied from line 20 through a solenoid 23, a second motorized valve 22, an electrical flow meter 63, balancing orifices 74 and 75 and switching valves 66, 67 to the regenerative burners 1 or 21.

When the burner embodiment of FIG. 1 is used, the second oxidizing gas, for example pure oxygen, is supplied from oxygen line 68 through solenoid 69, a third motorized valve 70, an electronic flowmeter 71 and a fourth motorized valve 73 to mix with the first oxidizing gas delivered to the regenerative bed 7 of burner 1. When the burner embodiment of FIG. 2 is used a fraction of the entire stream of the second oxidizing gas is directed through a fifth motorized valve 72, balancing orifices 74 and 75, switching valves 66, 67 to the burners 21.

An exhaust blower 78 is used to evacuate flue gases through one or the other of the regenerative beds and further through one of a pair of switching valves 81, 82 and a sixth motorized valve 80. A seventh motorized valve 79 is used to allow the exhaust blower to dilute the exhaust gases with ambient air for temperature reduction and to provide a flow of air through the exhaust blower when sixth motorized valve 80 is closed. An auxiliary exhaust furnace duct 3 is used only as an exhaust means during the non-regenerative firing mode.

Figure 5:
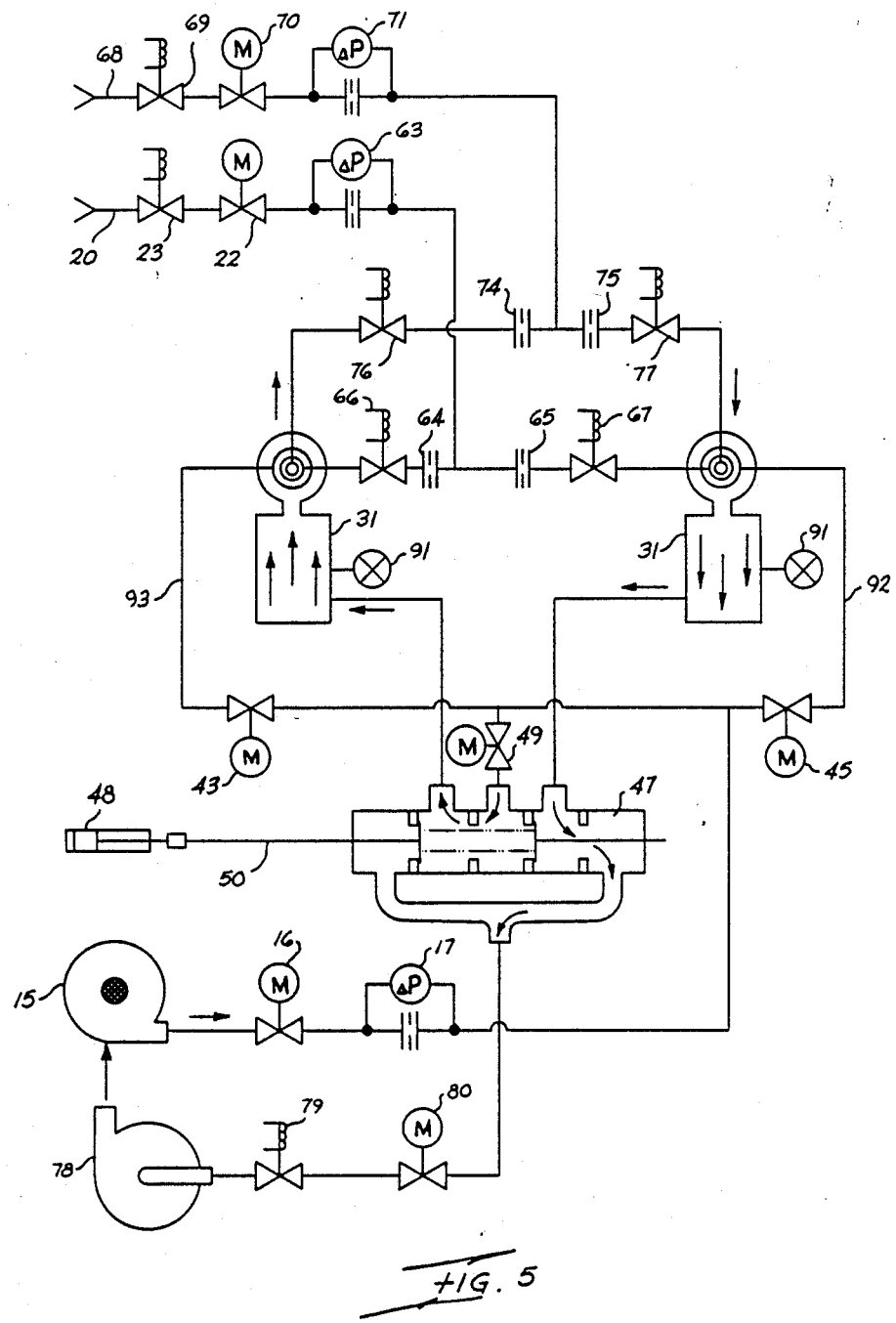
FIG. 5 is a combustion flow diagram of a second embodiment of a regeneration burner system according to the present invention.

FIG. 5 shows another embodiment of the combustion flow diagram wherein, additionally, an eighth motorized valve 43 and a ninth motorized valve 45 which is associated with the burner embodiments of FIG. 3 are used to provide at least a portion of the first oxidizing gas from blower 15 to the combustion chamber 33 of the burner 31, by-passing the regenerative bed 37 of burners 31 during the non-regenerative firing cycle. A tenth motorized valve 49 is used to control the flow of the first oxidizing gas being delivered through the regenerative bed 37 of the firing burner 31 during the regenerative firing cycle. A reversing valve 47 combines the function of the exhaust and air supply switching valves inside one casting. An actuator 48 is used to move the shaft 50 of the reversing valve 47 to connect one of the burner's regenerative beds 37 to exhaust pressure and the remaining regenerative bed 37 to the first oxidizing gas supply flow.

Referring now to all of the figures, the operation of the system will be described.

When a batch has been charged into the interior of the furnace, the both burners of regenerative pair initiate the non-regenerative firing mode. During this firing mode, fuel is supplied from the fuel line 20 through the open solenoid 23, motorized valve 22, flow meter 63, flow balancing orifices 64, 65 open switching valves 66, 67 and to the combustion chambers of both burners. When embodiment of FIG. 4 is used, the first oxidizing gas (i.e. air) is supplied, as shown in FIGS. 1, 2, and 4, by the blower 15, the flow controlling motorized valve 16, flow meter 17 and both open switching valves 18 and 19 to both burners 1. Accordingly, when the embodiment shown in FIG. 3 and FIG. 5 is used, air is supplied from blower 15, by flow controlling first motorized valve 16, electrical flow meter 17, motorized valve 43 and motorized valve 45, and nozzles 32 into the combustion chamber 33 of both burners 31.

When the embodiments shown in FIG. 2 and 3 are used, the second oxidizing gas is supplied from oxygen line 68 through open solenoid 69, third motorized flow controlling valve 70, flow meter 71, motorized balancing flow orifices 74 and 75 and switching valves 76 and 77 to both burners. Optionally, when the embodiment of FIG. 4 is used, the fraction of second oxidizing gas may be directed through line 83, motorized valve 73 to the mixer 84 to mix with first oxidizing gas. When burner embodiment shown in FIG. 1 is used, an entire flow of the second oxidizing gas is introduced through the line 83 flow controlling motorized valve 73 by mixer 84 into the combustion air flow supplied with the blower 15.

During the non-regenerative firing cycle, both burners of regenerative pair generate flame envelopes extending from the burner combustion chambers towards the furnace interior. At this time, maximum furnace input is achieved to optimize the rate of heat exchange between the flame and the relatively cold charge surface. After a significant portion of the heat is transferred to the charge, thereby raising the level of its surface temperature, reducing the level of heat flux to the load and raising the temperature of the flue gases, recuperation of heat from the flue gases becomes more economical. At this point, the non-regenerative firing mode is terminated and the combustion flow control system converts the burners to a regenerative firing mode.

When the regenerative firing cycle is used, the flows of fuel and the first and second oxidizing gases are adjusted to satisfy the new firing requirements. The supply of the second oxidizing gas may be completely shut down so that only the first oxidizing gas is used for combustion. Alternatively, for burner embodiments of FIG. 2 and 3, a small portion of the second oxidizing gas may still be supplied but only to one of the burner using switching valves 76 and 77 to control the switching actions. The fuel switching action will be controlled by use of switching valves 66 and 67 to distribute fuel to one of the burners and by terminating the fuel supply to the other burner which has been configured to act as an exhaust duct during this portion of the firing cycle. Combustion air supply from blower 15 is also delivered to only the firing burner through one of switching valves 18 or 19. The previously closed motorized valve 80 opens and exhaust switching valves 81 and 82 control the exhaust cycle, thereby delivering negative pressure at one of the burners while the other keeps firing. During every switch cycle, the burners alternate their functions by moving the flame and exhaust from one burner to the other.

When such alternative supplying of secondary oxidizing gas is used with the burner embodiments shown in FIGS. 2 and 3, the combustion process inside of the burner combustion chamber is conducted in two stages. During the first stage, the stream of second oxidizing gas is directed to mix with the fuel stream under substoichiometric conditions along the central axis of combustion chamber to oxidize partially the fuel to create a hot highly luminous flame core. The first oxidizing gas is directed to mix further with the pyrolyzed products of the flame core to accomplish further oxidation of combustible components of the core.

When the embodiment shown in FIGS. 3 and 5 is used during the regenerative firing cycle, the supply of combustion air through by-pass lines 92 and 93 is terminated by closing the motorized valves 43 and 45. The motorized valve 49 opens and the actuator 48 energizes the switching cycle.

A programmable process controller may be utilized to control the firing rate during the entire furnace operation by maintaining a desired fuel flow, a stoichiometric combustion ratio and a desired ratio between the first and second oxidizing gas flows.

The duration of the regenerative cycle is limited by the heat storage of the regenerative bed and may be controlled over intervals that may range from several seconds to several minutes. A timer or a thermocouple 92 sensing temperature in the regenerative beds may be used as shown on FIG. 5 to set the time or temperature set point of switching from one firing burner to the other during the regenerative firing mode.

In different heating processes utilizing a regenerative burner system, different events may be used to establish the switching point from non-regenerative to the regenerative mode. Time or the preset temperature of flue gases may be used as indication for the conversion of firing modes.

To prevent excessive plugging of the regenerative bed, the non-regenerative firing mode may also be used during the refining cycle when excessive fugitive pollution is anticipated.

Natural gas, oil, pulverized coal or any other pumpable combustible material may be used as the fuel. The regenerative bed may be made of any high temperature material, for example refractory material, metal or a combination of refractory material and metal. Two layers of refractory bolls on the top of metals bolls may be used to minimize the volume of the recuperative bed for a given heat absorption capacity and pressure drop. In this case, hot flue gases leaving the furnace 2 will initially cool down in the refractory layer to a temperature at which the metal bolls may be most effective in recovering heat from the colder flue gases leaving the recuperative bed due to the high thermal conductivity of metal and the specific heat storage per cubic foot of volume.

In addition, it is also possible to eliminate the non-regenerative cycle, and instead utilize a two stage regenerative cycle. In this option, the first regenerative stage uses the second oxidizing gas having a high oxygen concentration to pyrolize fuel under substoichiometric conditions, and the second stage uses the first oxidizing gas having a lower oxygen concentration to further oxidize the pyrolytic products of the first stage. The first oxidizing gas is preheated by a regenerative bed as it is supplied to the firing burner, thereby enhancing combustion.

Optionally, the burner embodiment of FIG. 1 may be comprised of means for delivering the oxygen preheated by the regenerative bed as a mixture of the first and second oxidizing gases into the combustion chamber of burner 1 in two streams, wherein the first stream of the mixture is directed to mix with a fuel stream to partially oxidize it and the remaining fraction of the mixture is directed to mix with products of the partially oxidized fuel to finalize combustion.

While the above description contains many specificities, these should not be construed as limitations on the scope of the invention but rather as an application of preferred embodiments thereof.

What is claimed is:

1. A method of combusting fuel in a furnace having a pair of regenerative burners, each burner having a combustion chamber, comprising:

(a) supplying fuel and oxygen alternatively to each burner to create alternating firing burners wherein said oxygen is supplied from two sources providing first and second oxidizing gases having different oxygen concentrations and simultaneously alternating the application of negative pressure to the remaining non-firing burner to recover heat from flue gases exhausted by the regenerative bed of the non-firing burner to be used further to preheat at least part of said oxygen being supplied to said firing burner;

(b) mixing said fuel with a fraction of said oxygen under substoichiometric combustion condition to create products of incomplete combustion to form a hot, luminous flame core containing partially pyrolized fuel; and (c) mixing said partially pyrolyzed fuel with a remaining fraction of said oxygen to complete combustion of said pyrolized fuel; and (d) controlling the total flow of fuel and oxygen supplied to each burner to provide each burner with a desired flame stoichiometry.

2. The method of claim 1, wherein said second oxidizing gas has an oxygen concentration greater than said first oxidizing gas.

3. The method of claim 1, and further comprising terminating the supply of said second oxidizing gas to said firing burner to reduce adiabatic flame temperature.

4. The method of claim 1, and further comprising terminating the supply of said first oxidizing gas to said firing burner to reduce the volume of combustion products to decrease the carryover of particulates from said furnace interior into said regenerative bed of said non-firing burner.

5. The method of claim 1, wherein said first oxidizing gas is preheated by said regenerative bed of said firing burner as said first oxidizing gas is separately supplied to said firing burner.

6. The method of claim 1, wherein both fractions of said oxygen are preheated by said regenerative bed of said firing burner as said fractions are supplied to said firing burner.

7. An apparatus for combusting fuel in a furnace having a pair of regenerative burners, each burner having a combustion chamber, comprising:

(a) means for alternatingly supplying fuel to each burner;

(b) means for alternatingly supplying oxygen from two sources providing first and second oxidizing gases having different oxygen concentrations to each burner to mix said fuel and oxygen to create alternating firing burners and non-firing burners; said means for supplying oxygen comprising:

(i) means for supplying one fraction of said oxygen under substoichiometric conditions to mix with said fuel to form a hot luminous flame core containing partially pyrolyzed fuel; and (ii) means for supplying a remaining fraction of said oxygen to combust said partially pyrolyzed fuel to form a highly luminous flame envelope and reduce $NO^x$ formation;

(c) means for applying negative pressure to said non-firing burner to recover heat from flue gases exhausted by the regenerative bed of the non-firing burner to preheat further at least part of said oxygen being supplied to said firing burner; and (d) means for controlling the total flow of fuel and oxygen supplied to each burner to provide each burner with a desired flame stoichiometry.

8. The apparatus of claim 7, wherein said means for supplying a first oxidizing gas supplies oxidizing gas having an oxygen concentration greater than the oxidizing gas supplied by said means for supplying a second oxidizing gas.

9. The apparatus of claim 7, and further comprising means for terminating the supply of said first oxidizing gas to said firing burner to reduce adiabatic flame temperature.

10. The apparatus of claim 7, and further comprising means for terminating the supply of said second oxidizing gas to said firing burner to reduce the volume of combustion products to decrease the carryover of particulates from said furnace interior into said regenerative bed of said non-firing burner.

11. The apparatus of claim 7, wherein said second oxidizing gas is preheated by said regenerative bed of said firing burner as said second oxidizing gas is supplied to said firing burner.

* * * * *